Oct. 29, 1968   J. IMIOLCZYK   3,407,545
ASSEMBLY FOR STATICALLY BALANCING ROTARY ARTICLES
Filed Dec. 13, 1965   2 Sheets-Sheet 1
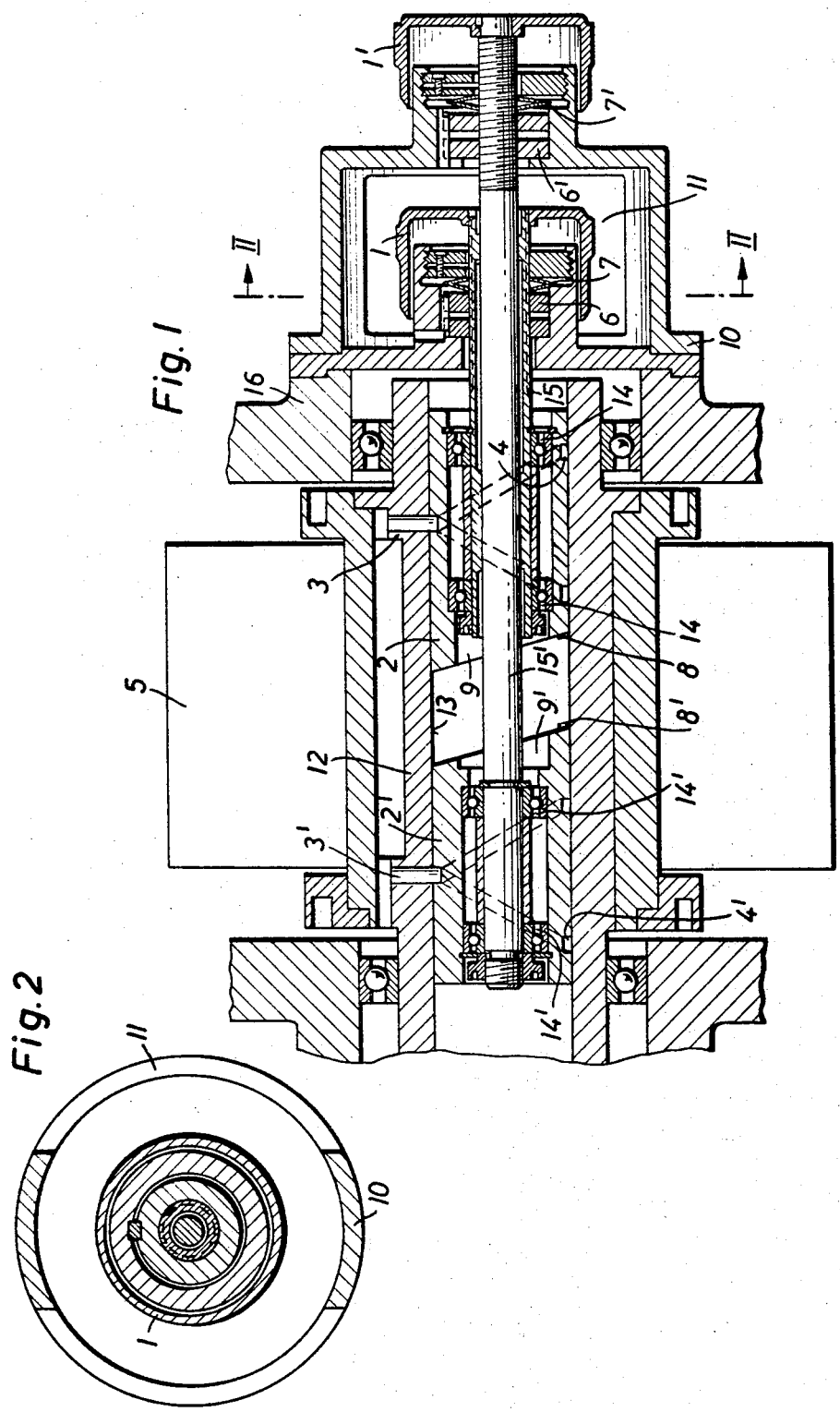

Oct. 29, 1968　　　　　J. IMIOLCZYK　　　　　3,407,545

ASSEMBLY FOR STATICALLY BALANCING ROTARY ARTICLES

Filed Dec. 13, 1965　　　　　　　　　　　　2 Sheets-Sheet 2

United States Patent Office 3,407,545
Patented Oct. 29, 1968

3,407,545
ASSEMBLY FOR STATICALLY BALANCING ROTARY ARTICLES
Josef Imiolczyk, Merkstein-Rimburg, Germany, assignor to Schumag Schumacher Metallwerke GmbH, Aachen, Germany, a corporation of Germany
Filed Dec. 13, 1965, Ser. No. 513,199
Claims priority, application Germany, Dec. 11, 1964, Sch 36,237
16 Claims. (Cl. 51—169)

ABSTRACT OF THE DISCLOSURE

The invention is an assembly for balancing a rotary body supported by a hollow shaft in which two balancing bodies have exterior surfaces that match the interior surface of the shaft. The bodies have a non-uniform weight distribution relative to the axis of the shaft and are connected to the shaft to rotate when moved axially of the shaft. Means are mounted exteriorly of the shaft to move the weights axially to cause rotary motion of the balancing bodies.

---

My invention relates to the static balancing of rotary articles such as grinding wheels of grinding machines.

In assemblies of this latter type, the rotary article which is to be statically balanced is carried by a hollow shaft which is supported for rotation by the frame of the machine and which accommodates in its interior balancing bodies capable of being adjusted from the exterior of the machine so as to statically balance the rotary article.

Known structures of this type, which may be used for dynamic as well as static balancing, include rotary eccentric bodies capable of being angularly turned one relative to the other for achieving static balance, while these bodies are turned together about their common axis to achieve dynamic balance, and the adjusting structure has rotary portions connected with the balancing bodies and stationary portions which are stationary in the sense that they do not turn with the rotary machine components, these so-called stationary portions being accessible at the exterior of the machine for actuation by the operator to adjust the eccentric balancing bodies. A structure of this latter type generally includes an inner eccentric member and an outer eccentric member turnable on the inner eccentric member, and a hollow adjusting shaft is connected through a suitable clutch to the outer eccentric member for adjusting the latter, while the inner eccentric member can be adjusted either separately from or together with the outer adjusting member depending upon whether static or dynamic balance is desired.

The adjusting structure for assemblies of this type include motion-transmitting rings, coupling elements, threaded elements having multiple threads, and the like, so that the structure is quite complex. For example, with these known structures adjusting nuts are guided for axial movement by suitable axially extending guide rods which prevent the nuts from turning, so that all of these devices provide an exceedingly complex bulky assembly which is difficult to situate in a relatively small space and which is complicated to operate.

It is accordingly a primary object of my invention to provide an assembly which is far less complicated than the known structures while at the same time capable of providing static balance.

In addition it is an object of my invention to provide an assembly which can achieve static balance not only with an exceedingly simple structure but also with a structure which is very easy to operate while at the same time guaranteeing satisfactory results.

In particular, it is an object of my invention to provide an assembly of this type which has an exceedingly small dimension in cross section so that the entire assembly of my invention can be easily accommodated in the hollow interior of a shaft of relatively small diameter.

Furthermore, it is an object of my invention to provide a structure capable of rendering a large number of elements of conventional structures completely unnecessary so that with the structure of my invention an exceedingly small number of elements are required to achieve the static balance.

Yet another object of my invention is to provide balancing bodies which, while having an exceedingly simple construction, nevertheless can be very inexpensively constructed to provide an extremely precise degree of non-uniform weight distribution to achieve the desired static balance.

One of the particular objects of my invention is to provide an exceedingly simple structure for converting axial displacement of a balancing body into angular movement thereof to change the static balance.

Also, it is an object of my invention to provide a structure which can be quickly and easily assembled.

In particular, it is an object of my invention to provide a structure which will function not only to convert axial displacement of the balancing bodies into angular turning thereof but which will also function to reliably maintain the bodies in their adjusted positions and properly assembled with the remaining structure.

Furthermore, it is an object of my invention to provide a structure which will reduce undesirable friction between relatively movable components.

It is especially an object of my invention to provide a structure of the above type wherein the frictional resistance to movement of the components is so low that an exceedingly fine accurate adjustment can be achieved without application of excessively large forces.

The objects of my invention also include the provision of an exceedingly simple convenient structure enabling the operator to selectively adjust from the exterior of the machine either one of a pair of balancing bodies, while still maintaining the entire assembly extremely compact.

The objects of my invention also include the provision of a structure which will reliably eliminate any play so as to guarantee the maintenance of the adjusted settings, even after the structure has been operated a large number of times and has been used to a very large extent so that adjusting threads have become worn and would provide undesirable play were it not for the structure of my invention.

The assembly of my invention includes an elongated hollow rotary shaft supported for rotation by a suitable machine frame and having in its interior a cylindrical surface, this shaft being adapted to support the rotary article such as the grinding wheel or the like which is to be statically balanced.

Within this hollow shaft are located a pair of balancing bodies of my invention, these bodies being situated one after the other along the axis of the shaft and having exterior cylindrical surfaces slidably engaging the interior cylindrical surface of the hollow shaft. Each of the balancing bodies of my invention has a non-uniform weight distribution about the axis of the shaft, so that angular turning of the bodies will change the static balance. An elongated spindle means of my invention extends into the hollow interior of the shaft and a motion-transmitting means connects the spindle means with the pair of balancing bodies. Accessible at the exterior of the machine frame is an adjusting means which is operatively connected to the spindle means for axially displacing the latter when the adjusting means is actuated, and motion-transmitting means connects the balancing bodies to the spindle means for axial movement therewith while freeing the bodies for rotary movement with respect to the spindle means, so that whenever the adjusting means is actuated either one or both of the bodies are axially displaced. A converting means is situated at the inner cylindrical surface of the hollow shaft and the exterior cylindrical surface of the bodies for converting the axial displacement of the bodies into angular displacement thereof, so that actuation of the adjusting means will achieve angular displacement of the bodies to provide the desired static balance.

My invention is illustrated by way of example in the accompanying drawings which form part of the application and in which:

FIG. 1 is a fragmentary longitudinal sectional elevation illustrating one possible embodiment of an assembly according to my invention;

FIG. 2 is a transverse section of the structure of FIG. 1 taken along line II—II of FIG. 1 in the direction of the arrows;

Figure 3:
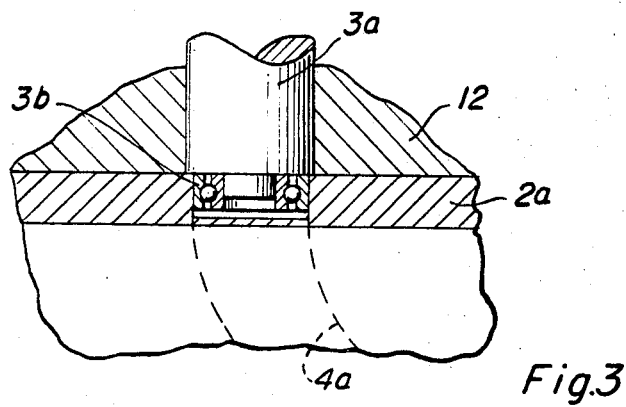
FIG. 3 is a fragmentary longitudinal sectional illustration of a structural variation of my invention which permits a substantial reduction in friction to be achieved.

FIG. 1 fragmentarily illustrates a machine frame 16 of a grinding machine, and this machine frame 16 supports for rotary movement the elongated hollow shaft 12. For this purpose suitable ball bearings are carried by the machine frame and engage the shaft 12 to support the latter for rotary movement. It is this shaft 12 which carries the grinding wheel 5 which turns together with the shaft 12 and which forms the rotary article which is to be statically balanced.

The hollow shaft 12 is provided at its interior with an elongated cylindrical inner surface 13 which is smooth and which is coaxially arranged with respect to the axis of shaft 12. Within the hollow shaft 12 are arranged the balancing bodies 2 and 2' of the assembly of my invention, and these balancing bodies are situated one after the other along the axis of the shaft 12 and respectively have exterior cylindrical surfaces slidably engaging the interior cylindrical surface 13, so that with very little frictional resistance it is possible for the bodies 2 and 2' to turn as well as to slide axially with respect to the surface 13. When the bodies 2 and 2' are not being adjusted, they have predetermined axial and angular positions with respect to the shaft 12, and the structure of my invention will reliably maintain the bodies 2 and 2' in their adjusted positions where they rotate together with the shaft 12 so as to remain in their adjusted positions relative thereto.

As will be apparent from the description below, the angular adjustment of the balancing bodies 2 and 2' is brought about by axial displacement thereof and a converting means is provided for converting the axial displacement of the bodies into angular turning thereof. This converting means includes helical grooves 4, 4' respectively formed in the exterior surfaces of the bodies 2 and 2', and pins 3 and 3' carried by the shaft 12 and respectively extending into the grooves 4 and 4'. The pitch of the helically extending grooves 4 and 4' is constant and such that in response to axial thrust on the bodies 2 and 2', they will turn relative to the pins 3 and 3' while shifting axially.

The axial displacement of the balancing bodies 2 and 2' is brought about by way of a spindle means which includes an outer elongated hollow spindle 15 and an inner spindle 15' which extends through the outer spindle 15. A motion transmitting means connects the spindle means to the balancing bodies for constraining these bodies to shift axially with the spindle means while freeing the bodies for rotation relative to the spindle means. This motion transmitting means includes, according to a further feature of my invention, ball bearings 14 and 14'. Thus, as may be seen from FIG. 1, the ball bearings 14 respectively have inner races which are fixed to the exterior surface of the hollow spindle 15 and outer races fixed to the inner surface of the elongated hollow balancing body 2, so that in this way any axial movement of the spindle 15 must be accompanied by the same axial movement of the body 2. At the same time, however, the body 2 is free to rotate together with the shaft 12 relative to the spindle 15 when he latter is not axially displaced. In the same way, the ball bearings 14' include inner races which are fixed to the exterior surface of the inner spindle 15' and outer races fixed to the interior of the elongated hollow balancing body 2', so that the latter can be acted upon the spindle 15' in the same way that the body 2 is acted upon the spindle 15.

The pair of spindles 15 and 15' which form the spindle means of my invention are provided with threads at their exterior surfaces, and these threads are respectively received in nuts 6 and 6'. These nuts are fixedly carried by the machine frame 16, in a manner described in greater detail below, so that turning of the spindle means relative to the nuts will provide axial displacement of the spindle means and corresponding axial displacement of the balancing bodies through the motion transmitting means of my invention, as described above. Of course, this axial displacement of the balancing bodies will result in angular displacement thereof corresponding to the degree of axial displacement as a result of the converting means in the form of the pins 3, 3' and grooves 4, 4' which provide angular turning of the bodies in response to axial displacement thereof.

The balancing bodies 2 and 2' are in the form of elongated hollow bodies of substantially cylindrical configuration and having open ends so that they are capable of receiving in their interiors the motion-transmitting means formed by the ball bearings 14 and 14', and of course it is also possible as a result of this structure for the spindles 15 and 15' to extend into the interiors of the tubular bodies 2 and 2'. Each of these bodies has a non-uniform distribution of its weight circumferentially about the axis of the shaft 12, and in order to achieve this latter non-uniform weight distribution, each of the bodies is provided with an end face situated in a plane which is inclined to the axis of the shaft 12 at an angle other than a right angle. These inclined end faces 8 and 8' of the bodies 2 and 2' are respectively arranged adjacent and directed toward each other, and it will be noted from FIG. 1 that actually these inclined end faces are parallel to each other, so that the degree of non-uniform weight distribution of one of the bodies is the same as that of the other of the bodies, and thus the 2 bodies 2 and 2' of the invention have equal degrees of unbalance. It is to be noted that this equal degree of unbalance is achieved in addition by way of the axial bores 9 and 9' of the bodies 2 and 2', respectively. These bores are made of equal diameters so that the wall thicknesses of the bodies are, at least in the region of the inclined end faces, equal, and thus, in this way, a truly identical degree of unbalance is achieved for both bodies, assuming that the end faces 8 and 8' are parallel to each other, which is to say that they are inclined to the same extent with respect to the axis of the shaft 12.

The nuts 6 and 6', which together with the threaded portions of the spindles 15 and 15' form the adjusting means of my invention, are each in the form of known double-nut assemblies, capable of being acted upon by a spring for eliminating play in the threaded connection. It will be noted that the structure of FIG. 1 includes the cup-spring assemblies 7 and 7' acting on the double-nut assemblies 6 and 6' so as to maintain them at a predetermined mechanical stress which guarantees that they will always cooperate without any play with the threads of the spindles even when as a result of frequent use of the structure of my invention over a long period of time a certain wearing away of the threads has taken place. Each nut 6 or 6' includes a pair of separate nut portions having at their exterior axial keyways receiving a common key so that the nut portions cannot turn one relative to the other. However, they can move axially within the limits of the play in the threads, and the springs 7 eliminate this play.

The nut 6 is mounted directly on the machine frame 16. This machine frame includes the hollow housing member 10 fixed in any suitable way to the machine frame 16 and accommodating the nut 6 in its interior. A manually engageable member in the form of a knob 1, for example, is fixed directly to the hollow spindle 15 so that the latter can be manually turned whenever desired, and a similar manually engageable member 1' is fixed to the right free end of the inner spindle 15' which passes through a wall of the housing member 10 in the manner indicated in FIG. 1.

As is shown particularly in FIG. 2, the housing member 10 is formed in its opposed side walls with openings 11 through which free access may be had to the adjusting knob 1.

In order to further reduce the friction of the converting means formed by the pin and helical groove connection between the balancing bodies and the hollow shaft 12, the structure shown in FIG. 3 may be used. Thus, it will be noted from FIG. 3 that the pin 3a which can replace the pins 3 and 3' carries a ball bearing 3b whose outer race engages the inner side surfaces of the helical groove 4a formed in the body 2a so that with this construction there will be very little frictional resistance between the pin and groove during axial displacement of the balancing body.

As is apparent from the above description, during operation of the machine the grinding wheel 5 will turn together with the shaft 12 and the bodies 2 and 2' will also turn together with the shaft 12. However, the spindles 15 and 15' will remain stationary, and of course the structure shown in the right of FIG. 1 and carried by the spindles will also remain stationary. However, the operator can at any time turn the knobs 1 or 1' so as to achieve static balance as required.

It is to be noted that the arrangement of the bodies 2 and 2' one after the other along the axis of the shaft 12 enables the latter to have a relatively small diameter. This compactness of the assembly of my invention is further enhanced by arranging the spindles so that an inner spindle 15' passes through an outer spindle 15.

Furthermore, the assembly of the structure is exceedingly simple. It is only required to slide the bodies 2 and 2' axially into the interior of the shaft 12. Then the pins 3 and 3' are passed transversely through the shaft 12, in suitable bores thereof, into the grooves 4 and 4', respectively. Each of these grooves will not have more than one convolution since it is not required to extend through more than 360° about the axis of the shaft 12. Therefore, the extending of the pins 3 and 3' into the grooves 4 and 4', respectively, serves not only to form the above-described converting structure, but also to provide a secure connection of the bodies to the shaft 12. As long as the pins are in the grooves the bodies 2 and 2' cannot be removed from the shaft 12 and in addition they will be maintained with this structure in their angularly adjusted positions where they rotate together with the shaft 12.

The feature of providing a non-uniform weight distribution by a simple inclined end face of the balancing body makes the body of my invention quite inexpensive while at the same time giving the possibility of providing an exceedingly precise degree of unbalance.

Figure 4:
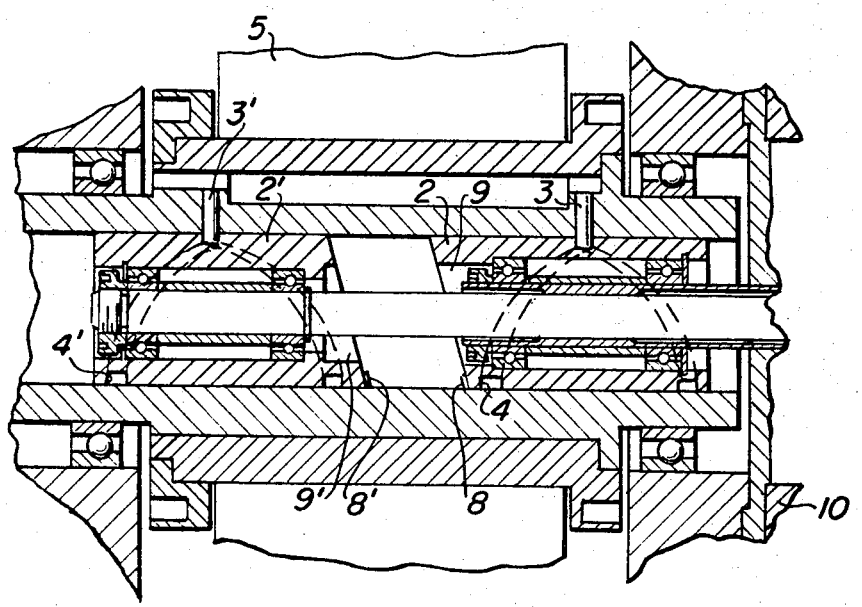
FIG. 4 illustrates a further possible variation of the structure of my invention.

The pitch of the helical grooves 4 and 4' can be maintained constant over their entire length. However, in special cases it may be desirable to provide each helical groove in one region with a pitch smaller than in another region. FIG. 4 shows the bodies 2 and 2' respectively provided with grooves 4 and 4' of a variable pitch which changes along the length of each groove. The use of only a single pin in each groove greatly simplifies the assembly of the structure.

It is particularly to be noted that the structure for rendering the spindles accessible to the operator for turning is exceedingly simple while at the same time providing no sacrifice in the ease or accuracy of the adjustment.

Of course, many of the features of my invention described above and shown in the drawings can be used either separately or in other combinations.

I claim:

1. An assembly for statically balancing a rotary article such as a grinding wheel, comprising a machine frame, a hollow rotary shaft supported for rotation by said machine frame and having an inner cylindrical surface, said shaft being adapted to carry the rotary article which is to be statically balanced, a pair of balancing bodies situated in said hollow shaft and each having an exterior cylindrical surface slidably engaging said interior cylindrical surface of said shaft, said balancing bodies being arranged one after the other along the axis of said shaft and each balancing body having a non-uniform weight distribution about the axis of said shaft so that balancing can be achieved by angular orientation of said bodies with respect to said shaft, elongated spindle means extending coaxially along the interior of said shaft, adjusting means carried by the machine frame and operatively connected with said spindle means for axially adjusting the latter when a change in the static balance is desired, motion-transmitting means operatively connected with said bodies and said spindle means for constraining said bodies to be axially displaced together with said spindle means while freeing said bodies for rotary movement relative to said spindle means, so that when said adjusting means is actuated to axially displace said spindle means said bodies will be axially displaced therewith, and converting means situated at said inner surface of said shaft and said exterior surfaces of said bodies and operatively connecting said shaft and bodies to each other for converting axial movement of said bodies with said spindle means into angular displacement of said bodies about the axis of said hollow shaft for adjusting the static balance.

2. An assembly as recited in claim 1 and wherein said bodies are of substantially cylindrical configuration.

3. An assembly as recited in claim 1 and wherein the extent of non-uniform weight distribution of said bodies about said axis are respectively equal.

4. An assembly as recited in claim 1 and wherein said bodies are each of an elongated tubular configuration and said spindle means extending into the interiors of said bodies.

5. An assembly as recited in claim 1 and wherein each of said bodies is provided with at least one end face inclined to the axis of said hollow shaft at an angle other than a right angle for achieving the non-uniform weight distribution about the axis of said shaft.

6. An assembly as recited in claim 1 and wherein said converting means includes a pair of helical grooves respectively formed in the exterior surfaces of said bodies and a pair of pins respectively fixed to said shaft and extending into said grooves.

7. An assembly as recited in claim 6 and wherein said pins have exterior surfaces slidably engaging the groove surfaces.

8. An assembly as recited in claim 6 and wherein said pins respectively carry bearings situated in said grooves and engaging said bodies for reducing the friction between said pins and bodies.

9. An assembly as recited in claim 1 and wherein said motion transmitting means includes ball bearings connected on the one hand with said bodies and on the other hand with said spindle means.

10. An assembly as recited in claim 1 and wherein said spindle means includes an outer hollow spindle and an inner spindle extending coaxially through said outer spindle, said outer and inner spindles being respectively connected operatively to said bodies through said motion transmitting means.

11. An assembly as recited in claim 10 and wherein said outer and inner spindles both have exterior threads forming part of said adjusting means, said adjusting means further including a pair of nuts carried by the machine frame and cooperating with said threads of said outer and inner spindles, respectively, for providing axial displacement of said spindles when the latter are turned relative to said nuts.

12. An assembly as recited in claim 11 and wherein said machine frame includes a hollow housing member having an interior in which the nut which is connected with said outer spindle is situated, said inner spindle extending through a wall of said housing member and said housing member carrying the nut which cooperates with said inner spindle, said outer and inner spindles respectively carrying manually engageable members capable of being grasped and turned by the operator for respectively turning said spindles, and said housing member being formed with at least one opening giving access to the manually engageable member connected to said hollow spindle.

13. An assembly as recited in claim 1 and wherein said adjusting means includes threaded portions of said spindle means and nuts carried by said machine frame and respectively threadedly engaging said threaded portions of said spindle means, said nuts taking the form of double-nut devices capable of eliminating play in the threaded connection with the spindle means when spring pressure is applied axially to said double-nuts, and said adjusting means including springs acting on said double-nuts for eliminating play automatically in the threaded connection between the nuts and the spindle means.

14. An assembly for statically balancing a rotary article such as a grinding wheel, comprising a machine frame, an elongated hollow shaft supported for rotation by said machine frame and having an inner cylindrical surface, said shaft being adapted to carry the article which is to be statically balanced, a pair of elongated balancing bodies situated in said hollow shaft and having exterior cylindrical surfaces slidably engaging the interior cylindrical surface of said shaft, said bodies being spaced from each other along the axis of said shaft and having directed toward each other a pair of end faces, respectively, which are parallel to each other and inclined to the axis of said shaft at an angle other than a right angle, said bodies each being formed with an axial bore passing therethrough, an outer threaded spindle extending coaxially into one of said bodies, an inner threaded spindle extending coaxially through said outer spindle into the other of said bodies, at least one ball bearing in each of said bodies having an outer race fixed to said body and an inner race fixed to the spindle therein, so that through said ball bearings said bodies are constrained to move axially with said spindles, respectively, but are free to rotate with respect thereto, a pair of nuts carried by the machine frame and respectively threadedly engaging said spindles, a pair of manually engageable means respectively fixed to said spindles and accessible to the operator so that the operator can turn said spindles for axially displacing the same, and means situated at the inner surface of said hollow shaft and the exterior surfaces of said bodies for converting axial displacement of said bodies with said spindles, respectively, to angular displacement of said bodies about the axis of said shaft, for achieving static balance of a rotary article carried by said hollow shaft for rotation therewith.

15. An assembly as recited in claim 1 and wherein said converting means includes a pair of helical grooves of constant pitch respectively formed in the exterior surfaces of said bodies and a pair of pins respectively fixed to said shaft and extending into said grooves.

16. An assembly as recited in claim 1 and wherein said converting means includes a pair of helical grooves of variable pitch respectively formed in the exterior surfaces of said bodies and a pair of pins respectively fixed to said shaft and extending into said grooves.

References Cited

UNITED STATES PATENTS

| 1,903,817 | 4/1933 | Johnson. | |
| 2,930,169 | 3/1960 | Mohrenstein | 51—169 |
| 3,339,430 | 9/1967 | Klein | 74—573 |

JAMES J. GILL, *Primary Examiner.*